Oct. 10, 1967 W. H. BARKOW 3,346,765

RASTER DISTORTION CORRECTION

Filed Aug. 31, 1964 3 Sheets-Sheet 1

INVENTOR.
William H. Barkow
BY William H. Meagher
ATTORNEY

INVENTOR.
William H. Barkow
BY William H. Meagher
ATTORNEY

RASTER DISTORTION CORRECTION

Filed Aug. 31, 1964

INVENTOR.
William H. Barkow
BY William H. Meagher
ATTORNEY 3,346,765
Patented Oct. 10, 1967

3,346,765

RASTER DISTORTION CORRECTION

William H. Barkow, Pennsauken, N.J., assignor to Radio Corporation of America, a corporation of Delaware Filed Aug. 31, 1964, Ser. No. 393,185
9 Claims. (Cl. 315—27)

ABSTRACT OF THE DISCLOSURE

Top and bottom pincushion corrector uses saturable reactor apparatus to introduce an appropriately modulated horizontal frequency component into the vertical scanning current path. The saturable reactor apparatus functions, not as a variable impedance modulator of the vertical scanning current, but, rather, effectively as a transformer with a tuned secondary as a series element in the vertical scanning current path; the transformer effectively has two "competing" primary windings of oppositely poled coupling to the secondary. These primaries, energized by horizontal frequency waves, alternately prevail over each other to a variable degree, and in a manner determined by the vertical scanning current itself.

This invention relates to circuit arrangements for providing electromagnetic deflection of a cathode ray beam to develop a scanning raster, and, particularly, to circuit arrangements for reducing distortions occurring in the developed raster.

In a television apparatus having means for electromagnetically deflecting an electron beam in a cathode ray device, a deflection yoke is positioned about a neck of the device and circuit means cause cyclically varying currents to flow in deflection windings of the yoke. A varying electromagnetic field, which is thereby generated, deflects the electron beam and forms a raster on a target of the device. In general, the raster which is formed is desirably rectangular shaped. However, various types of electron beam scanning distortions can occur and cause the generated raster configuration to deviate from the desired rectangle.

One well-known form of raster distortion with which the present invention is concerned is so-called "pincushion" distortion, and, particularly, the "top and bottom" aspect of such distortion. This type of distortion is characterized by a central bowing of the raster scanning lines, the character of the bowing varying from a maximum downward bowing at the raster top through a minimum near the raster middle to a maximum upward bowing at the raster bottom. The bowing is typically hyperbolically or parabolically shaped. This distortion results partly from the physical geometry of the deflection system as determined by such factors as the size and configuration of the target area and the relative position of an electron beam deflection center with respect to the target and, partly from the electrical choice of design parameters for the deflection yoke.

Pincushion distortion (or its inverse—"barrel" distortion) is undesirable and means for generally provided for correcting these defects in the raster configuration. In certain apparatus, static correction is adequate and is generally accomplished by establishing a nonvarying magnetic field which in cooperation with a varying electromagnetic field generated by the deflection yoke provides a corrected deflection field. However, in other apparatus such as television receiving apparatus utilizing relatively wide-angle or multi-beam cathode ray devices, a static correction means is not suitably effective in providing the correction desired. In the latter type of apparatus, the art has provided a dynamic form of correction circuit.

In the arrangement for correction raster distortion occuing in the vertical direction (e.g., top and bottom pincushion distortion), the cyclically varying vertical scanning current ($f_1$), must be altered at a higher horizontal rate ($f_2$). Since the vertical scanning current may be considered constant over a horizontal period ($f_2$), a horizontal rate change of inductance in the vertical scanning current circuit cannot be relied upon to cause a change in the vertical scanning current. Therefore a horizontal rate correction current ($f_2$) must be added to the vertical deflection current ($f_1$).

U.S. Patent No. 2,682,012, issued to R. K. Lockhart on June 22, 1954, discloses a solution to the top and bottom aspect of the pincushion distortion problem, the solution involving the use of auxiliary equipment including, inter alia, a pair of electron discharge devices; the Lockhart circuitry develops a modulated line frequency component which is effectively added to the conventional field frequency scanning current wave in the vertical deflection winding of a deflection yoke. In U.S. Patent No. 2,842,709, issued to P. M. Lufkin on July 8, 1958, circuitry is disclosed for solving the side aspect of pincushion distortion, said circuitry involving use of a saturable reactor device; in the functioning of the Lufkin apparatus, the horizontal scanning current in the horizontal deflection winding of a deflection yoke is effectively modulated in amplitude by a field rate wave using the saturable reactor as a variable impedance type of modulating device.

The present invention is concerned with a novel and simplified approach to top and bottom pincushion correction. Considerable simplification of the correction circuitry (relative to that shown, for example, in the above-discussed Lockhart patent) is afforded through the use of saturable reactor apparatus to introduce the appropriately modulated horizontal frequency component into the vertical scanning current path. However, the saturable reactor apparatus does not function as a variable impedance modulator of the vertical scanning current in the sense of the Lufkin patent use of saturable reactor apparatus. Rather, the saturable reactor apparatus serves effectively as a transformer with a tuned secondary as a series element in the vertical scanning current path; the transformer effectively has two "competing" primary windings of oppositely poled coupling to the secondary. These primaries, energized by horizontal frequency waves, alternately prevail over each other to a variable degree, and in a manner determined by the vertical scanning current itself.

In accordance with an illustrative embodiment of the present invention, the reactor comprises a two-window, three-leg core, with an output winding wound on the center core leg, and with respective halves of an input winding wound on respectively different outside core legs (disposed parallel to said center core leg). The effective poling of the respective input winding halves in such that, though energized by the same horizontal scanning current, they tend to drive horizontal flux through the center core leg in mutually opposing directions. Thus, when their respective flux contributions are matched in amplitude there is complete cancellation of horizontal frequency flux variations in the center core leg, with the result that no horizontal frequency energy is transferred to the output winding. However, should their respective flux contributions differ, cancellation in the central core leg will not take place, with the result that there is effective flux linkage between the output winding and one of the input winding halves; thus, horizontal frequency variations will be transferred to the output winding circuit by simple transformer action, the amplitude of the transferred variations depending upon the degree of difference in flux contributions, and the polarity depending upon which flux contribution is predominant.

In the illustrative circuit, dynamic control of the relative horizontal flux contributions is afforded by the vertical scanning current, itself, which flows through the output winding on the center core leg. During a first portion of the vertical scan cycle, when vertical scanning current is in a first direction, it induces a flux that (1) opposes a bias flux in a core segment linking the center leg to one outside leg (thereby increasing the permeability of this core segment) and (2) adds to a bias flux in a core segment linking the central leg to the other outside leg (thereby lowering the permeability of this core segment). The reverse is true during a succeeding portion of the vertical scan cycle when the scanning current reverses direction.

Thus, horizontal frequency variations of one polarity are transferred to the output winding from one input winding segment with maximum amplitude at a first peak of vertical scanning current; maximum amplitude transfer of opposite polarity horizontal frequency variation from the other input winding segment occurs at the succeeding opposite direction peak of vertical scanning current. A polarity crossover occurs intermediate these peaks; a steady decrease in amplitude of the first polarity transfer occurs during approach of the crossover from the first peak, and a steady increase in amplitude of the opposite polarity transfer occurs subsequent to the crossover.

The modulated horizontal frequency component thus transferred to the output winding is of the form appropriate to top and bottom pincushion correction, as discussed, for example, in the previously mentioned Lockhart Patent No. 2,682,012. So that a magnitude of this modulated horizontal frequency component sufficient for correction purposes may be caused to appear in the vertical deflection winding means are provided for resonating the output winding to the fundamental horizontal frequency. With such output winding tuning, a readily attainable level of control winding voltage will develop sufficient horizontal frequency voltage across the output winding to add the requisite horizontal frequency current component to the vertical scanning current in the vertical yoke winding. The horizontal frequency variations introduced will be essentially sinusoidal in shape, but it is observed that such a shape sufficiently approximates the ideal parabolic waveshape to effect an acceptable correction.

Accordingly, it is an object of this invention to provide a circuit arrangement utilizing a reactor for correcting raster distortions occurring in a television apparatus.

Another object of this invention is to provide in a television apparatus, an improved form of raster correction circuit employing a reactor.

Another object of this invention is to provide in a television receiver, an improved form of circuit arrangement having a reactor effective pincushion or barrel raster correction in a vertical direction.

These and other objects of the invention will become apparent with reference to the following specifications and drawings in which.

Figure 1:
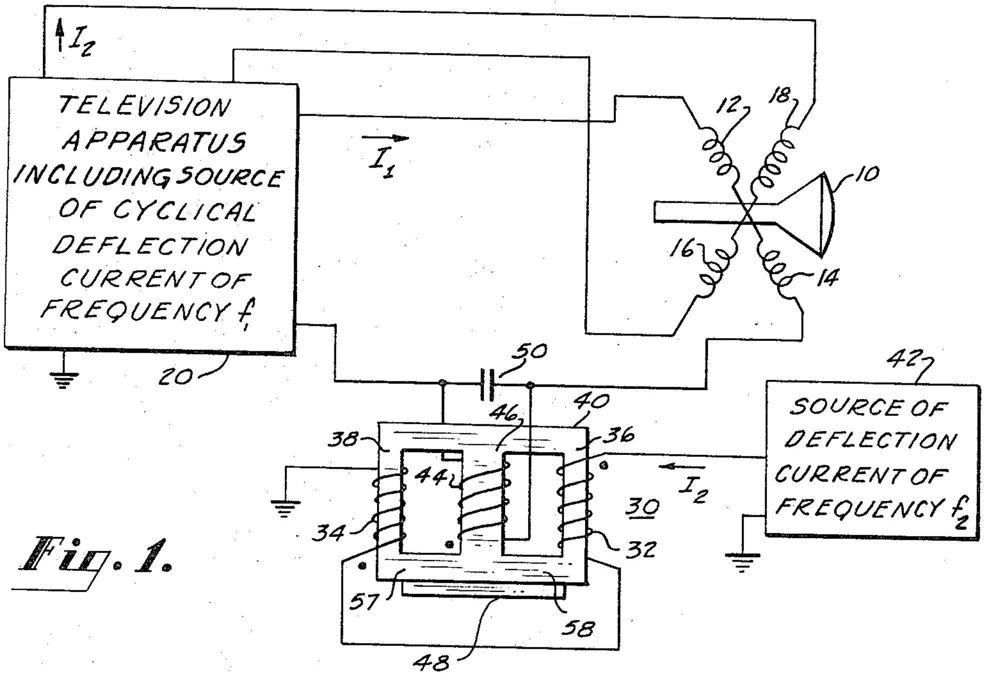
FIGURE 1 is a diagram, partly in block form, of a television apparatus utilizing an embodiment of the present invention.

In FIGURE 1, a television apparatus is shown to include a cathode ray device 10, deflection windings 12 and 14 for deflecting an electron beam of the device 10 in a first direction, deflection windings 16 and 18 for deflecting the beam in a second direction, and conventional circuit means represented by the block 20 for causing a cyclical current $I_1$ of frequency $f_1$ to flow in the windings 12 and 14 and a cyclical current $I_2$ of frequency $f_2$ to flow in the windings 16 and 18. These currents generate varying electromagnetic fields for deflecting the electron beam in a scanning raster across a target of the device 10.

Figure 2A:
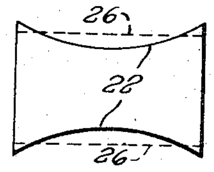
FIGURES 2A and 2B are diagrams illustrating pincushion and barrel distortion respectively.
Figure 2B:
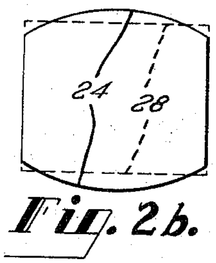

As indicated hereinbefore, various factors create "pincushion" or "barrel" distortion in the raster configuration which is formed. In FIGURE 2A, a raster having top and bottom "pincushion" distortion is illustrated, while in FIGURE 2B a raster having a top and bottom "barrel" distortion is shown. The characteristic "pincushion" inward central bowing raster top and bottom edges is indicated by the reference numeral 22 while the characteristic "barrel" outward central bowing of the raster top and bottom edges is represented by reference numerals 24 in FIGURE 2B. It is desirable that the raster have a generally rectangular shape and that the edges 22 and 24 of the raster 2A and 2B respectively coincide with the dotted lines 26 and 28.

In providing this function a raster correction circuit having a reactor indicated generally as 30 in FIGURE 1, is provided. The reactor includes an input winding having separate windings 32 and 34 positioned about outside segments 36 and 38 respectively of a body of ferromagnetic material 40. The body 40 is shown to define a magnetic circuit of two-window configuration. The windings 32 and 34 which are coupled in series are wound on the body 40 in a manner indicated in greater detail hereinafter and are coupled to a source 42 of deflection current of frequency $f_2$. An output winding 44 is positioned on a center segment 46 of the body 40 and is coupled in series with the deflection windings 12 and 14. Means for establishing a magnetic bias flux in the body 40 comprises a magnet 48 which is positioned in proximity with respect to the body 40. An electromagnetic circuit arrangement for generating the bias flux can be utilized in place of the magnet 48. A capacitor 50, whose function is described hereinafter, is coupled in parallel with the output winding 44.

Figure 3:
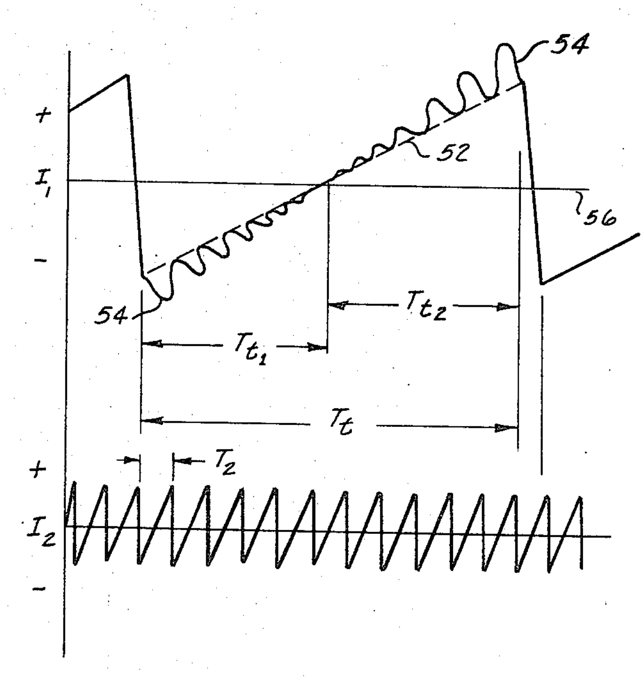
FIGURE 3 is a diagram of waveforms of current flowing in the apparatus of FIGURE 1.

In providing pincushion correction, the amplitude of a trace segment of a sawtooth current $I_1$ of frequency $f_1$ is altered in a manner best described by reference to the waveform of the current $I_1$ shown in FIGURE 3. The unaltered waveform of current $I_1$ has a trace segment represented by the dotted line 52. In FIGURE 3, the waveform of current $I_1$ is shown modified to include a varying component of 54. The varying component 54 has a progressively decreasing amplitude from the initiation of trace to intersection with an A-C axis 56 of the waveform of the current $I_1$ and then exhibits phase reversal and a progressively increasing amplitude from the A-C axis 56 to the termination of the trace segment. The modified waveform of current $I_1$ of FIGURE 3 is therefore adapted to correct pincushion distortion in one direction and to effect a substantially rectangular raster. The barrel distortion of FIGURE 2B can be corrected by reversing the phase of the component 54 of FIGURE 3 during the trace intervals $T_{t1}$ and $T_{t2}$.

Figure 4:
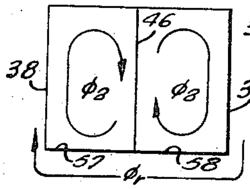
FIGURE 4 is a diagram illustrating a magnetic input flux in a reactor of FIGURE 1.
Figure 5:
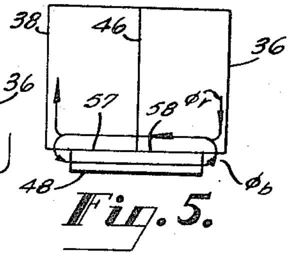
FIGURE 5 is a diagram illustrating a magnetic bias flux existing in the reactor of FIGURE 1.
Figure 6:
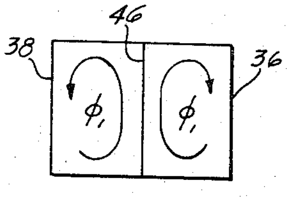
FIGURE 6 is a diagram illustrating a vertical deflection current flux existing in the reactor of FIGURE 1.

The manner in which the correction circuit of the present invention provides such a waveform can best be explained with reference to FIGURES 4 through 10. The input windings 32 and 34 in FIGURE 1 are polarized for causing lines of magnetic flux to flow in the magnetic circuit in the directions illustrated in FIGURE 4 when a current $I_2$ of frequency $f_2$ flows into a terminal of the winding 32 which is marked by the reference symbol (·). In the winding convention adopted, current flowing into a terminal mark (·) causes lines of magnetic flux to flow into the winding at the terminal so marked and to exit from the winding at its opposite terminal. Thus, the current $I_2$ flowing into the marked terminals of the windings 32 and 34 in FIGURE 1 establishes the flux $\phi_2$ in the body as indicated in FIGURE 4; in the center segment 46 there are two mutually opposing components of the flux $\phi_2$. Illustratively, the windings 32 and 34 are arranged for providing an equal magnetic intensity, H, when the current $I_2$ flows therein. Accordingly, the two opposing components of flux $\phi_2$ established by this current cancel in the center segment 46 and the resultant flux, $\phi_r$, flows in a clockwise direction in only the outside segments of the magnetic circuit. The permanent magnet 48 is adapted to establish a bias flux $\phi_b$, also flowing in a clockwise direction in a magnetic circuit formed by the magnet 48 and segments 57 and 58 of the body 40. The bias flux, $\phi_b$, established by the magnet 48 is illustrated in FIGURE 5.

Figure 7:
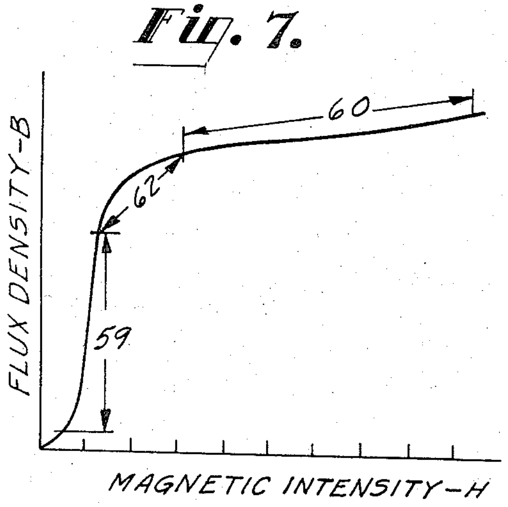
FIGURE 7 is a magnetization characteristic curve for the ferromagnetic material from which the reactor of FIGURE 1 is fabricated.

A magnetization characteristic for the ferromagnetic material for which the body 40 is fabricated is illustrated in FIGURE 7. This curve includes a region of relatively high permeability defined by a segment 59, a region of relatively low permeability defined by a segment 60, and a knee segment 62 extending from a region of relatively high permeability to the region of relatively low permeability. The permanent magnet 48 establishes a flux in the segments 57 and 58 which is of a magnitude sufficient for causing the magnetization characteristic of each of these body segments to lie in the region of its magnetization characteristic defined by the knee segment 62. In addition, the magnet 48 is adapted for maintaining an equal flux density in the segments 57 and 58 and provides for zero resultant flux in the center segment 46. As th current $I_1$ increases in amplitude along its trace segment 52 during a positive alternation (period $T_{t2}$) as illustrated in FIGURE 3, a flux is generated thereby. This flux, illustrated in FIGURE 6, causes the flux density in segment 58 to increase and to thereby be driven to a state of lower permeability while the flux in segment 57 decreases and is driven to a state of relatively higher permeability. This unbalance of permeability causes a component of flux generated by the current $I_2$ to flow in the center segment 46. This component of flux $\phi_2$ causes a current of frequency $f_2$ to be induced in the winding 44. The previously referred-to capacitor 50 resonates the winding 44 to a desired frequency thus causing a circulating current to flow in the resonant circuit. This circulating current has a waveform illustrated by the waveform of the alternating component 54 in FIGURE 3. The voltage developed across the capacitor 50 to produce the component 54 is added to the segment 52 to provide a resultant waveform. During the period $T_{t1}$ (FIGURE 3) the flux generated in the center segment by the current $I_1$ reverses in direction with respect to its direction through this same segment during the period $T_{t2}$. Accordingly, the phase of the component 54 during the period $T_{t1}$ is reversed.

Figure 8:
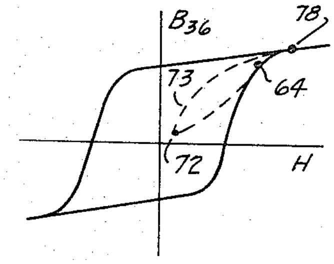
FIGURE 8 is a hysteresis curve for a segment of the reactor of FIGURE 1.
Figure 9:
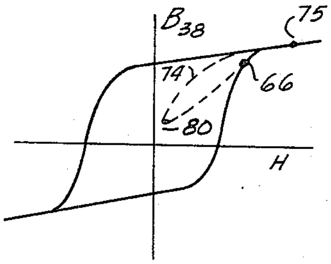
FIGURE 9 is a hysteresis curve for another segment of the reactor of FIGURE 1.
Figure 10:
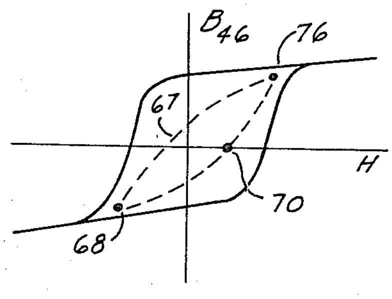
FIGURE 10 is a hysteresis curve for still another segment of the reactor of FIGURE 1.

The operation of the correction circuit may be further explained with reference to the hysteresis diagrams of FIGURES 8, 9, and 10. FIGURE 8 is the hysteresis diagram of the segment 58 which is shown to have a flux bias point 64; while FIGURE 9 is the hysteresis diagram of segment 57, which is shown to have a bias point 66. As indicated hereinbefore, no net flux exists in the central segment as a result of bias flux and control current flux and the bias points 64 and 66 represent points of equal flux density. When the amplitude of the trace segment 52 of the current $I_1$ decreases in amplitude during the interval $T_{t1}$, the flux in the center segment 46 varies in accordance with the dotted hysteresis loop 67 of FIGURE 10, from the point 68 to the point 70. In general, it is undesirable to drive the center segment to magnetic saturation. Accordingly, a high reluctance path such as an air gap is inserted in the center segment for causing this segment to traverse the hysteresis loop 67. Since the segments 58 and 57 are biased, the flux in the segment 58 decreases during the interval $T_{t1}$ to the point 72 on the minor hysteresis loop 73 of FIGURE 8 while the flux in the segment 57 increases along the minor hysteresis loop 74 to the point 75. Because the flux caused by the current $I_1$ during period $T_{t1}$ disturbs the flux balance in the center segment 46, one component of flux $\phi_2$ in the center segment 46 (viz., that passing through segment 58) exceeds the opposing direction component therein. The resultant center segment flux varies along a smaller loop similar to the loop 67 of FIGURE 10 at the rate $f_2$. Similarly, during the interval $T_{t2}$ the flux in the center segment varies at the rate $f_2$ in accordance with the oppositely polarized $\phi_2$ flux variations passing through segment 57, due to the flux increase in segment 58 to the point 78, and the flux decrease in segment 57 to the point 80. These variations of the flux in the center segment at the rate $f_2$ induces a current in the output winding 44, as was previously indicated. By tuning this winding to a desired frequency such as the frequency $f_2$, a circulating current flows in the resonant circuit. The voltage developed across the capacitor 50 causes the current 54 to flow in the deflection winding in addition to the trace segment 52. As the segments 58 and 57 are driven from the bias points 64 and 68 respectively, to extreme points 72 and 80 by the flux generated by the current $I_1$, the permeability of these segments increases and the magnitude of the $\phi_2$ flux component flowing in the center segment 46 similarly increases during the intervals $T_{t1}$ and $T_{t2}$. The current induced in the winding 44 accordingly increases in amplitude. Thus, the amplitude of the trace segment 52 has an alternating component which increases in amplitude on either side of the A-C axis of the current $I_1$. The barrel distortion of FIGURE 2B may similarly be corrected by reversing the polarity of the current $I_2$.

Figure 11:
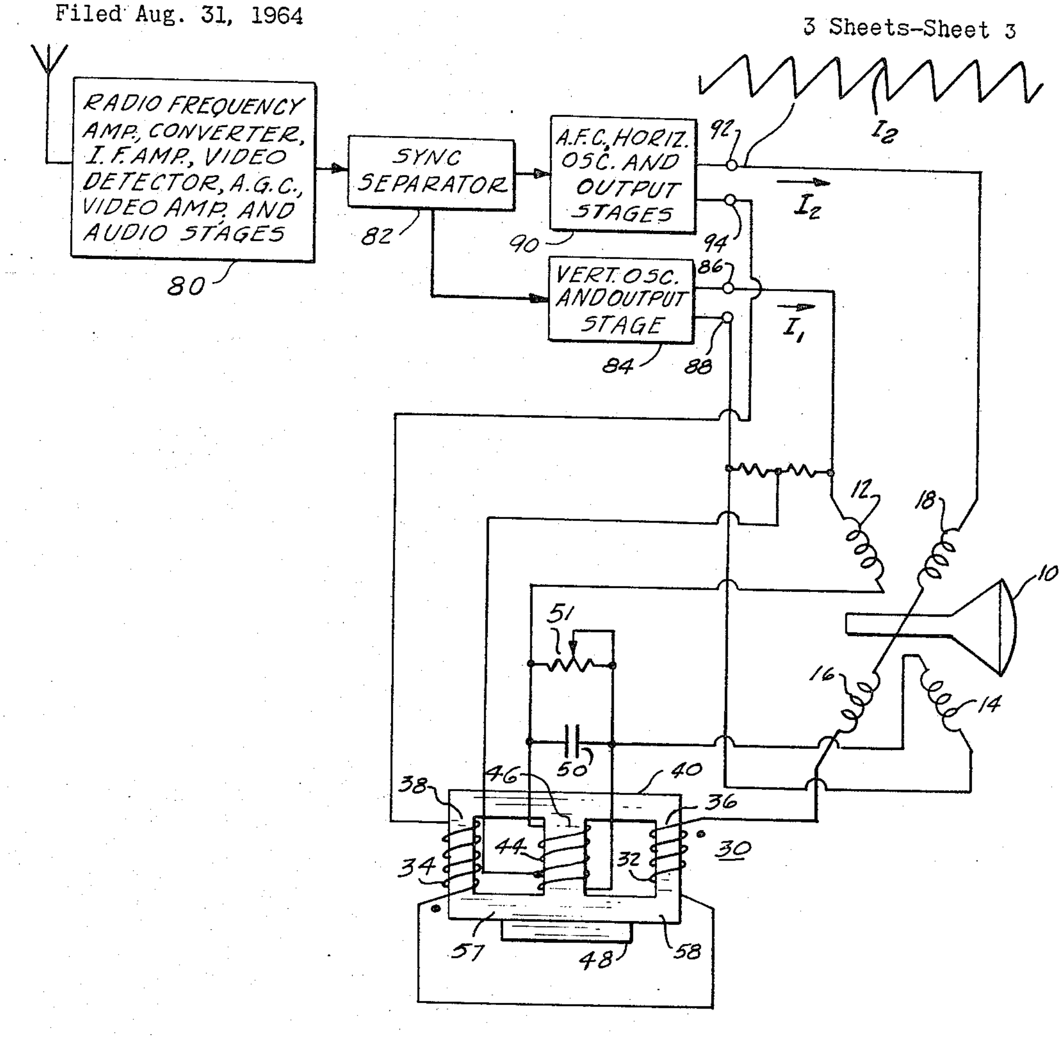
FIGURE 11 is a diagram, partly in block form of a television receiving apparatus utilizing an embodiment of the invention.

FIGURE 11 illustrates a television receiving apparatus utilizing an embodiment of the present invention. Elements of FIGURE 11 which are similar to elements of FIGURE 1 bear similar reference numerals. A conventional radio frequency amplifier stage, converter stage, intermediate frequency amplifier stage, video detector stage, automatic gain control stage, video amplifier stage and audio stage are employed in the receiver and are represented generally by the block 80. A composite video signal including synchronizing components is derived from the video amplifier stage and coupled to conventional synchronizing separator stage 82. A vertical synchronizing signal is separated by this stage and coupled to a vertical deflection stage and an output stage. This section provides a voltage between output terminals 86 and 88 for causing a cyclically varying current of vertical deflection rate and sawtooth waveform to flow in vertical deflection windings 12 and 14. The previously referred-to resonant circuit including the output winding 44 and the capacitor 50 is serially interposed between these windings. This resonant circuit is resonant at the frequency of the horizontal deflection current $I_2$. Variable resistor 51, shunted across the resonant circuit, varies the Q of the circuit for control of correction magnitude.

In order to excite resonant circuit 44–50 and to modify the sawtooth vertical deflection current to assume the waveform of the current $I_1$ of FIGURE 3, the control windings 32 and 34 are coupled in series with horizontal deflection windings 16 and 18. A conventional horizontal deflection section 90 including an automatic frequency control stage, a horizontal oscillator stage, and an output stage provides a voltage between output terminals 92 and 94 for causing a cyclically varying current $I_2$ at a horizontal deflection rate and of sawtooth waveform to flow in the horizontal deflection windings 16 and 18 and in the input windings 32 and 34. The latter windings are adapted to provide a relatively small impedance to the current $I_2$ while coupling energy of horizontal frequency to the output winding 44. The reactor 30 of FIGURE 11 operates in accordance with the description given with respect to FIGURE 1.

Various modifications may be made in the correction circuit arrangement to suit particular applications. For example, the current $I_1$ and the current $I_2$ of FIGURE 11 are shown to comprise currents of sawtooth waveform. Various other waveforms may be utilized and the resonant circuit may be tuned accordingly to provide the desired alternation in the trace segment of deflection current $I_1$.

One contemplated modification of the described apparatus involves arranging winding 44 as a pair of series-connected winding segments wound together in bifilar fashion, with a resultant improvement in the Q of the output winding resonant circuit. Another contemplated modification involves the shunting of a series resonant circuit, tuned to the fundamental horizontal frequency, across output terminals 86, 88 of vertical output stage 84, to provide a low impedance return path for the horizontal frequency component introduced via winding 44 (as well as to reduce horizontal interference in the vertical oscillator circuit).

If desired, means may be provided to vary the position of bias magnet 48 relative to the core segments 57 and 58 to control balance or unbalance of pincushion correction top to bottom; it is to be noted that the pincushion distortion to be corrected is not necessarily symmetrical from top to bottom. One also may desire to provide a variable shunt on bias magnet 48 to serve as a correction waveform amplitude control.

While input winding segments 32 and 34 have been shown in series relationship, they may alternatively be connected parallel aiding relationship. Also, segments 57 and 58 of the reactor core may be made smaller in cross-section than the rest of the core structure.

What is claimed is:

1. A deflection circuit arrangement for a television apparatus comprising:

a deflection winding adapted for deflecting an electron beam of a cathode ray device in one direction when a deflection current flows therein;

a body of ferromagnetic material arranged in a two-window magnetic circuit configuration having first and second outside body segments and a center segment;

means establishing a magnetic bias flux in said body;

first and second series coupled input windings positioned respectively about said first and second outside body segments;

an output winding positioned about said center segment;

means coupling said output winding in series with said deflection winding;

reactive circuit means coupled to said output winding and forming a parallel resonant circuit with said output winding;

means for causing a deflection current of frequency ($f_1$) and sawtooth waveform to flow in said deflection winding and in said resonant circuit; and a source of current of relatively higher frequency ($f_2$) coupled to said input windings.

2. A deflection circuit arrangement for a television apparatus comprising:

a deflection winding adapted for deflecting an electron beam of a cathode ray device in one direction when a deflection current flows therein;

a body of ferromagnetic material arranged in a two-window magnetic circuit configuration having first and second outside body segments and a center segment;

said ferromagnetic material having a magnetization characteristic curve including a knee segment extending between regions of relatively high and relatively low permeability;

means establishing a magnetic flux in said body for biasing said first and second body segments in the region of said knee segment of said characteristic curve;

first and second series coupled input windings positioned respectively about said first and second outside body segments;

an output winding positioned about said center segment;

means coupling said output winding in series with said deflection winding;

reactive circuit means coupled to said output winding for forming a parallel resonant circuit with said output winding;

means for causing a deflection current of frequency ($f_1$) and sawtooth waveform to flow in said deflection winding and in said resonant circuit; and a source of relatively higher frequency current ($f_2$) coupled to said input winding.

3. A deflection circuit arrangement for a television receiver comprising:

a vertical deflection winding;

a horizontal deflection winding;

a body of ferromagnetic material arranged in a two-window magnetic configuration having first and second outside body segments and a center segment;

said ferromagnetic material having a magnetization characteristic curve including a knee segment extending between regions of relatively high and relatively low permeability;

means for establishing a magnetic flux in said body for biasing said first and second body segments in the region of said knee segment of said characteristic curve;

first and second series coupled input windings positioned respectively about said first and second outside segments;

an output winding positioned about said center segment;

means coupling said output winding in series with said vertical deflection winding;

means coupling said input windings in series with said horizontal deflection windings;

a capacitance coupled in parallel with said output winding and adapted to form a parallel resonant circuit with said output winding;

a source of vertical deflection current coupled to said vertical deflection winding for causing a deflection current having a vertical deflection rate to flow therein; and a source of horizontal deflection current coupled to said horizontal deflection winding for causing a deflection current having a horizontal deflection rate to flow therein.

4. In a cathode ray tube scanning system including a deflection yoke having respective horizontal and vertical deflection windings, a first source of horizontal scanning current, a second source of vertical scanning current, and means coupling said yoke to said first and second sources in such manner that said horizontal scanning current is caused to traverse said horizontal deflection winding and said vertical scanning current is caused to traverse said vertical deflection winding;

pincushion correction apparatus comprising, in combination:

a saturable reactor device including input means and an output winding;

means for utilizing said saturable reactor device to add a horizontal frequency current component to the vertical scanning current traversing said vertical deflection winding;

said last-named means including means for rendering said input means responsive to said horizontal scanning current, means for interposing said output winding in series with said vertical deflection winding in the path of said vertical scanning current, and means causing said saturable reactor device to transfer horizontal frequency energy from said input means to said output winding with a variable magnitude and polarity.

5. In a cathode ray tube scanning system including a deflection yoke having respective horizontal and vertical deflection windings, a first source of horizontal scanning current, a second source of vertical scanning current, and means coupling said yoke to said first and second sources in such manner that said horizontal scanning current is caused to traverse said horizontal deflection winding and said vertical scanning current is caused to traverse said vertical deflection winding;

pincushion correction apparatus comprising, in combination:

a saturable reactor device including a magnetic core, a pair of input winding segments, an output winding and means for establishing a biasing flux in a segment of said core;

and means for utilizing said saturable reactor device to add a horizontal frequency current component to the vertical scanning current traversing said vertical deflection winding;

said last-named means including means for interposing said pair of input winding segments in series with said horizontal deflection winding in the path of said horizontal scanning current and means for interposing said output winding in series with said vertical deflection winding in the path of said vertical scanning current, the poling and relative disposition of said input winding segments and said output winding on said core being such that a net transfer of horizontal frequency energy from one of said input winding segments to said output winding occurs when said vertical scanning current traverses said output winding in a first direction, and a net transfer of horizontal frequency energy from the other of said input winding segments occurs when said vertical scanning current traverses said output winding in a direction opposite to said first direction, the instantaneous magnitude of energy transferred from each input winding segment to said output winding depending upon the instantaneous amplitude of said vertical scanning current.

6. In a cathode ray tube scanning system including a deflection yoke having respective horizontal and vertical deflection windings, a first source of horizontal scanning current, a second source of vertical scanning current, and means coupling said yoke to said first and second sources in such manner that said horizontal scanning current is caused to traverse said horizontal deflection winding and said vertical scanning current is caused to traverse said vertical deflection winding;

pincushion correction apparatus comprising, in combination:

a source of a modulated horizontal frequency current component;

and means for interposing said last-named source in series with said vertical deflection winding in the path of said vertical scanning current;

said source of modulated horizontal frequency current comprising the output winding of a saturable reactor device, said output winding being connected in series with said vertical deflection winding in the path of said vertical scanning current;

said saturable reactor device also having a pair of input winding segments with variable coupling to said output winding, the respective variable couplings being effectively oppositely poled and differentially responsive to the amplitude of the vertical scanning current traversing said output winding;

said input winding segments being coupled to said first source so as to be traversed by said horizontal scanning current.

7. In a cathode ray tube scanning system including a deflection yoke having respective horizontal and vertical deflection windings, a first source of horizontal scanning current, a second source of vertical scanning current, and means coupling said yoke to said first and second sources in such manner that said horizontal scanning current is caused to traverse said horizontal deflection winding and said vertical scanning current is caused to traverse said vertical deflection winding;

pincushion correction apparatus comprising, in combination:

a saturable reactor device having a magnetic core, a pair of input winding segments and an output winding;

means for utilizing said saturable reactor device to provide differentially variable couplings between the respective input winding segments and said output winding, said utilizing means including means for magnetically biasing first and second segments of said core, and means for interposing said output winding in the path of said vertical scanning current, said output winding being disposed on said core such that flux developed by said vertical scanning current in said output winding aids said magnetic biasing in said first core segment and opposes said magnetic biasing in said second core segment when the scanning current is in a first direction and such developed flux opposes said magnetic biasing in said first core segment and aids said magnetic biasing in said second core segment when said scanning current in said output winding is in a second direction opposite to said first direction, said first core segment constituting a portion of a first flux path linking one of said pair of input winding segments with said output winding and said second core segment constituting a portion of a second flux path linking the other of said pair of input winding segments with said output winding;

and means for utilizing said differentially variable couplings to add a horizontal frequency current component to the vertical scanning current traversing said vertical deflection winding, the added horizontal frequency current component having a variable amplitude dependent upon the amplitude of said vertical scanning current and having a polarity dependent upon the direction of said scanning current, said last-named means comprising means for energizing said input winding segments with horizontal frequency energy derived from said horizontal scanning current source, the poling and disposition of said pair of input winding segments on said core being such that said differentially variable couplings are effectively oppositely poled.

8. Pincushion correction apparatus in accordance with claim 7 wherein means are provided in association with said output winding for tuning said output winding substantially to the fundamental frequency of said horizontal scanning current whereby the added horizontal frequency current component is substantially sinusoidal.

9. Pincushion correction apparatus in accordance with claim 7 wherein said magnetic core comprises a two-window structure having a center segment and a pair of outer segments, said output winding being wound about said center segment and said pair of input winding segments being wound about respectively different ones of said outer segments.

References Cited

UNITED STATES PATENTS 2,906,919 9/1959 Thor ---------------- 315—24

JOHN W. CALDWELL, *Acting Primary Examiner.*

DAVID G. REDINBAUGH, *Examiner.*

T. A. GALLAGHER, R. L. RICHARDSON, *Assistant Examiners.*